(12) United States Patent
Yamada et al.

(10) Patent No.: US 9,982,415 B2
(45) Date of Patent: May 29, 2018

(54) REMOTE CONTROL SYSTEM FOR WORK MACHINES

(71) Applicant: Hitachi, Ltd., Chiyoda-ku, Tokyo (JP)

(72) Inventors: Hiroyuki Yamada, Tokyo (JP); Takamasa Kai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/300,477

(22) PCT Filed: Apr. 9, 2014

(86) PCT No.: PCT/JP2014/060237
§ 371 (c)(1),
(2) Date: Sep. 29, 2016

(87) PCT Pub. No.: WO2015/155845
PCT Pub. Date: Oct. 15, 2015

(65) Prior Publication Data
US 2017/0121938 A1    May 4, 2017

(51) Int. Cl.
*E02F 9/20*    (2006.01)
*E02F 9/26*    (2006.01)
(Continued)

(52) U.S. Cl.
CPC ............... *E02F 9/205* (2013.01); *E02F 9/26* (2013.01); *G05D 1/0276* (2013.01); *E02F 3/32* (2013.01); *G05D 2201/0202* (2013.01)

(58) Field of Classification Search
CPC ... E02F 9/205; E02F 9/26; A63G 9/16; A63G 31/16; G09B 9/048; G09B 9/48;
(Continued)

(56) References Cited

U.S. PATENT DOCUMENTS 3,557,304 A * 1/1971 Rue .................... G05D 1/0038
                                                      244/3.14
5,092,408 A * 3/1992 Tatara .................... F15B 21/08
                                                      172/2
(Continued)

FOREIGN PATENT DOCUMENTS

JP         06065949 A  *  3/1994
JP         9-217382 A      8/1997
(Continued)

OTHER PUBLICATIONS

Hitachi, "Zaxis 30 35 40 50 hydraulic excavator" brochure, KS-EN131EU, 2009, 24 pages (Year: 2009).*
(Continued)

*Primary Examiner* — Behrand Badii
*Assistant Examiner* — David A Testardi
(74) *Attorney, Agent, or Firm* — Crowell & Moring LLP

(57) ABSTRACT

Provided is a remote control system which controls a work machine from a remote place in order to improve safety and workability and to reduce fatigue of an operator. In the remote control system which controls the work machine from a remote place, a seat where the operator sits is driven to be inclined in conjunction with the machine, so that inclination information of the machine at the time of traveling is provided to the operator to be sensible and the safety and the workability are improved. On the other hand, a large inclined vibration caused by the work of the machine is not transferred to the operator since an inclination amount of the seat is kept when the machine is not traveling, so that the fatigue of the operator is reduced.

5 Claims, 6 Drawing Sheets

(51) Int. Cl.
*G05D 1/02* (2006.01)
*E02F 3/32* (2006.01)

(58) Field of Classification Search
CPC .... G05D 1/0038; G05D 1/0044; G05D 1/005; G05D 2201/0202
See application file for complete search history.

(56) References Cited

U.S. PATENT DOCUMENTS

| | | | | |
|---|---|---|---|---|
| 5,865,624 | A * | 2/1999 | Hayashigawa | G09B 9/04 434/29 |
| 6,115,639 | A * | 9/2000 | Takenaka | B62D 57/02 318/568.12 |
| 6,353,773 | B1 * | 3/2002 | Takenaka | B25J 9/1689 318/568.1 |
| 6,633,800 | B1 * | 10/2003 | Ward | B60W 50/02 180/167 |
| 6,778,097 | B1 * | 8/2004 | Kajita | E02F 3/437 340/12.5 |
| 8,634,969 | B2 * | 1/2014 | Buelthoff | G05D 1/005 434/44 |
| 2008/0180523 | A1 * | 7/2008 | Stratton | G05D 1/0044 348/114 |
| 2014/0365031 | A1 * | 12/2014 | Harrison | G05D 1/0016 701/2 |

FOREIGN PATENT DOCUMENTS

| | | | |
|---|---|---|---|
| JP | 09217382 | A * | 8/1997 |
| JP | 11061887 | A * | 3/1999 |
| JP | 2003064725 | A * | 3/2003 |
| JP | 2003162213 | A * | 6/2003 |
| JP | 3608141 | B2 | 1/2005 |
| JP | 2005-354479 | A | 12/2005 |
| JP | 2013-116773 | A | 6/2013 |
| JP | 2013116773 | A * | 6/2013 |

OTHER PUBLICATIONS

Maza, Mario et al., "Vehicle Teleoperation with a Multisensory Driving Interface", appearing in: Climbing and Walking Robots. Springer, Berlin, Heidelberg, 2005, pp. 437-445. (Year: 2005).*
Moon, Sung-Min et al., "Development of tele-operation control station for intelligent excavator", 2009 IEEE International Conference on Technologies for Practical Robot Applications (TePRA 2009), pp. 123-128 (Year: 2009).*
Ortiz, Jesus et al., "Description and tests of a multisensorial driving interface for vehicle teleoperation", Proceedings of the 11th International IEEE Conference on Intelligent Transportation Systems, Beijing, China, Oct. 12-15, 2008, pp. 616-621 (Year: 2008).*
Ross, Bill et al., "An advanced teleoperation testbed", 6th International Conference on Field and Service Robotics—FSR 2007, Jul. 2007, Chamonix, France. Springer, 42, 2007, Springer Tracts in Advanced Robotics, 10 pages (Year: 2007).*
Yamada, Hironao et al., "Master-Slave Control for Tele-Operation Construction Robot System", Transactions of the Japan Society of Mechanical Engineers Series C vol. 66 (2000) No. 651, pp. 3664-3671 (in Japanese) (Year: 2000).*
Yamada, Hironao et al., "Development of a teleoperation system for a construction robot", Journal or Robotics and Mechatronics (JRM), vol. 26 No. 1, 2014 (published Feb. 20, 2014 ), pp. 110-111 (Year: 2014).*
Zhao, Dingxuan et al., "Control method for realistic motion in construction tele-robotic system with a 3-DOF parallel mechanism", Journal of Robotics and Mechatronics (JRM), vol. 15 No. 4, 2003, pp. 361-368 (Year: 2003).*
International Search Report (PCT/ISA/210) issued in PCT Application No. PCT/JP2014/060237 dated Jun. 17, 2014 with English translation (Two (2) pages).

* cited by examiner (REMOTE CONTROL SYSTEM)

(ENLARGED VIEW OF VEHICLE OF HYDRAULIC SHOVEL)

(PEDESTAL DRIVING ACTUATOR OF REMOTE CONTROL SEAT)

(DIAGRAM OF CONFIGURATION OF REMOTE CONTROL SYSTEM)

(CONTROL FLOWCHART)

(CONTROL FLOWCHART: SECOND EMBODIMENT)

REMOTE CONTROL SYSTEM FOR WORK MACHINES

TECHNICAL FIELD

The present invention relates to a system which controls a work machine from a remote place, and particularly to a system in which a machine controls the traveling work machine from a remote place.

BACKGROUND ART

A work machine such as a construction machine and a transportation machine is generally configured such that an operator gets thereon and operates various types of levers and a handle to realize a desired work. In a case where these work machines are used at a place where a hill may be collapsed for example, there may be used a remote control unit such as an unmanned work machine which is controlled by the operator using a control facility installed at a remote place.

In the remote control of the work machine, an image captured by a camera attached in the work machine is transmitted to the control facility at the remote place in a wired or wireless manner, and the image is displayed on a monitor in the control facility. The operator operates an input device such as a control lever in the control facility while watching the image on the monitor and transmits an operation signal instructed by the input device to the work machine. Therefore, the work machine is operated in accordance with the instruction of the operator, and the control of the work machine from the remote place is realized.

Regarding typical remote control of such a work machine, PTLs 1 and 2 disclose remote control systems which provide information other than the image to the operator.

PTL 1 discloses a system for controlling a tower crane at a remote place, and an omniazimuth camera, a revolving sensor which detects a revolving position of a boom, and an inclination sensor which detects an inclination state of a virtual control seat in the tower crane are provided in the tower crane. Information obtained from these sensors are transmitted to a remote control room, and the control seat where an actual operator sits is rotated and inclined in synchronization with the revolving position of the boom and an inclination angle of a virtual control seat. With such a configuration, a state where the operator sits on the original control seat can be realized in real time even in the case of the remote control. The tower crane can be remotely operated without any uncomfortable feeling as usual.

In PTL 2, an operation force (excavating force and torsion) of the hydraulic shovel is detected by an operation force detector, and transmitted to a control device at the remote place. In the control device, the excavating force and the torsion are converted to have magnitudes of two sinusoidal waves by a controller, a seat where the operator sits is vibrated in the vertical direction using the sinusoidal wave based on the excavating force, and rotated using the sinusoidal wave based on the torsion. With such a configuration, it is possible to give a sense of realism so that the operator can feel the operation force. Furthermore, the workability can be improved.

CITATION LIST

Patent Literature

PTL 1: Japanese Patent Application Laid-Open No. 2013-116773

PTL 2: Japanese Patent Application Laid-Open No. H9-217382

SUMMARY OF INVENTION

Technical Problem

As disclosed in these literatures, the information, which the operator feels other than visual sense at the time of sitting in the machine, such as the inclination, the rotation, and the operation force of the machine as well as the image are provided in the remote control of the work machine as sensible information such as moving the seat where the operator sits even to a remote control facility. Therefore, the operator can make an operation without any uncomfortable feeling but just as a normal pattern. Further, since an obtained information amount is increased, an improvement in safety and workability can be expected.

However, when the sensible vibration and shaking such as the movement of the seat is transferred to the operator, the operator may feel fatigue. Therefore, the information less important for the work among the feeling information such as the inclination and the rotation of the machine may be not provided to the operator, so that the fatigue of the operator is reduced when the seat moves as less as possible by narrowing only the necessary information. An object of the invention is to provide a remote control system which provides sensible information to the operator by moving the seat in order to realize a reduction in fatigue of the operator without affecting on safety and workability.

Solution to Problem

In order to solve the above issue, according to the present invention, there is provided a remote control system for a work machine which is controlled by an operator from a remote control facility installed at a remote place, wherein the work machine includes a traveling unit, and an inclination detection unit that detects an inclination direction and an inclination amount of the machine, the remote control facility includes a seat on which the operator sits, and an inclination driving unit that inclines the seat, the inclination driving unit inclines the seat such that the seat is synchronized with the inclination direction and the inclination amount detected by the inclination detection unit when the work machine is traveling, and the inclination of the seat is controlled to keep a certain inclination amount when the work machine is not traveling.

In addition, according to the present invention, in the remote control system of the work machine, the seat is inclined to be synchronized with a low frequency component of the inclination amount detected by the inclination detection unit when the work machine is not traveling.

In addition, according to the present invention, in the remote control system of the work machine, the work machine includes a traveling state detection unit that detects whether the work machine is traveling or stopped, the inclination driving unit inclines the seat to be synchronized with the inclination direction and the inclination amount detected by the inclination detection unit during a period when the traveling state detection unit detects that the work machine is traveling, and the inclination of the seat is controlled to be kept in an inclination amount detected by the inclination detection unit at the time when the traveling state detection unit is switched from a traveling state to a stopped state during a period when the traveling state detection unit detects that the work machine is stopped.

In addition, according to the present invention, in the remote control system of the work machine, the work machine is configured by a traveling body and a revolving body that is supported to be rotatably about a vertical axis with respect to the traveling body, and includes a revolving detection unit that detects a rotation amount of the revolving body with respect to the traveling body, and when the work machine is not traveling, an inclination direction of the traveling body is directly or indirectly acquired by the inclination detection unit, an inclination direction of the revolving body is derived on the basis of the rotation amount detected by the revolving detection unit with respect to the inclination direction of the traveling body, and the seat is inclined to be synchronized with the revolving body in the inclination direction.

In addition, according to the present invention, in the remote control system of the work machine, the work machine includes an image detection unit that detects an image viewed from the machine, the remote control facility includes an image output unit that indicates an image to the operator, the image detected by the image detection unit is output to the image output unit without any change when the work machine is traveling, and when the work machine is not traveling, a vibration component in the image detected by the image detection unit caused by an inclination vibration of the machine is removed and then output by the image output unit.

Advantageous Effects of Invention

According to the invention, inclination information of the machine is provided to the operator to be sensible by moving the seat when the work machine is traveling. However, when the work machine is not traveling and doing the work such as excavating, loading, and transporting, the inclination information of the machine is not provided to the operator.

In general, a static inclination angle of the work machine is changed in a case where there is a step or a slope way in the ground surface where the work machine is placed. When the work machine is not traveling, the static inclination angle is not changed. In addition, the inclination information is necessary for the operator in real time when the work machine is traveling. In a case where the work machine runs over on a slope way, a step, or at a sunken place, there is a need to know whether the inclination angle is sufficiently safe for the machine not to be overturning. On the other hand, the machine is basically not traveling but stopped during the work such as excavating, loading, and transporting, and various mechanisms are operated for the work. At this time, the machine may be vibrated by a specific operation such as an emergency stop of the mechanisms and thus a dynamic inclination angle may be changed. The information on a dynamic inclination angle such as a vibration of the machine is not necessary when the operator is doing work, and may accumulate fatigue on the operator.

According to the invention, the operator can be known about the inclination information necessary during the traveling of the machine in real time, and the safety is increased. Further, the operator is not affected by the vibration of the machine occurring at the time of actual working, and thus the workability is improved. In addition, it is possible to reduce the fatigue of the operator.

DESCRIPTION OF EMBODIMENTS

Figure 4:
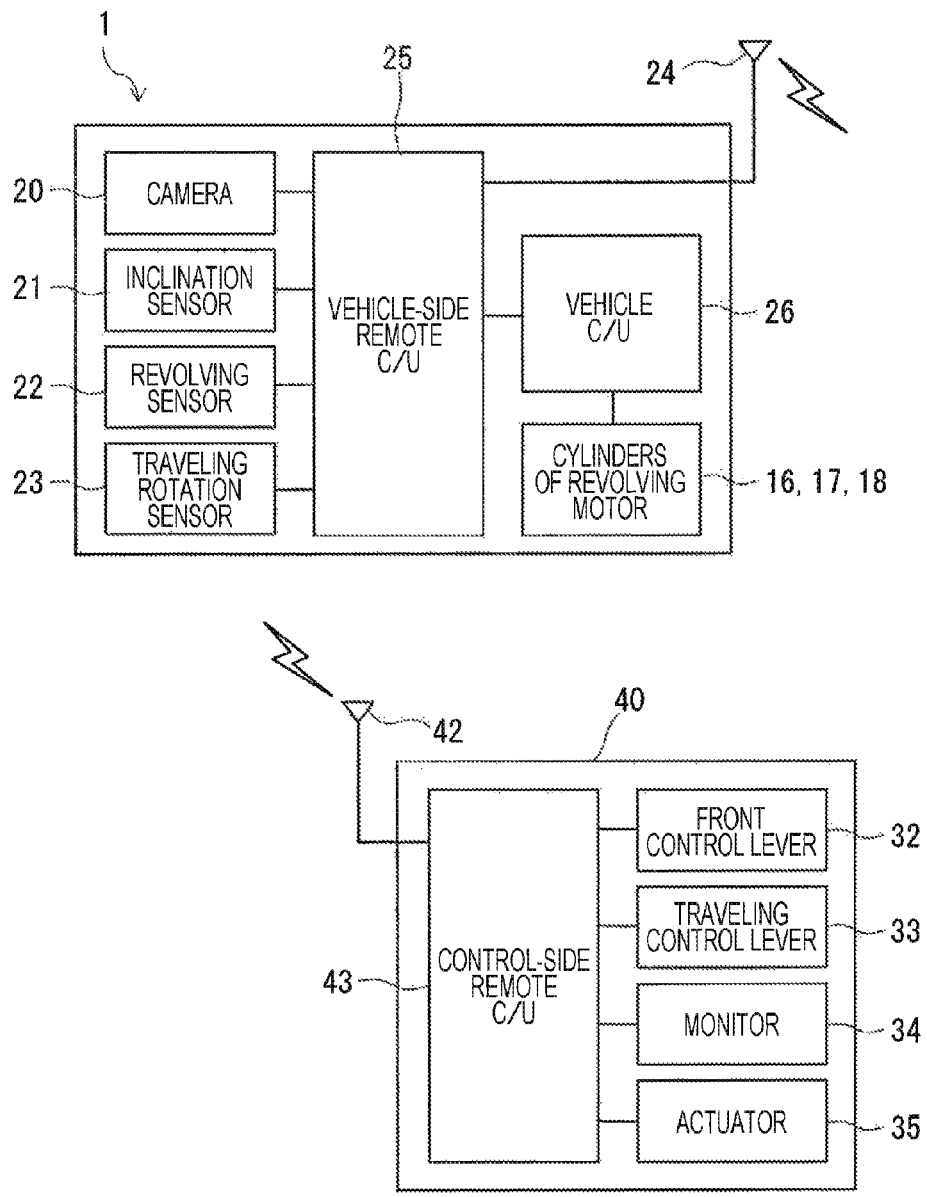
FIG. 4 is a diagram illustrating a configuration of the remote control system.
Figure 5:
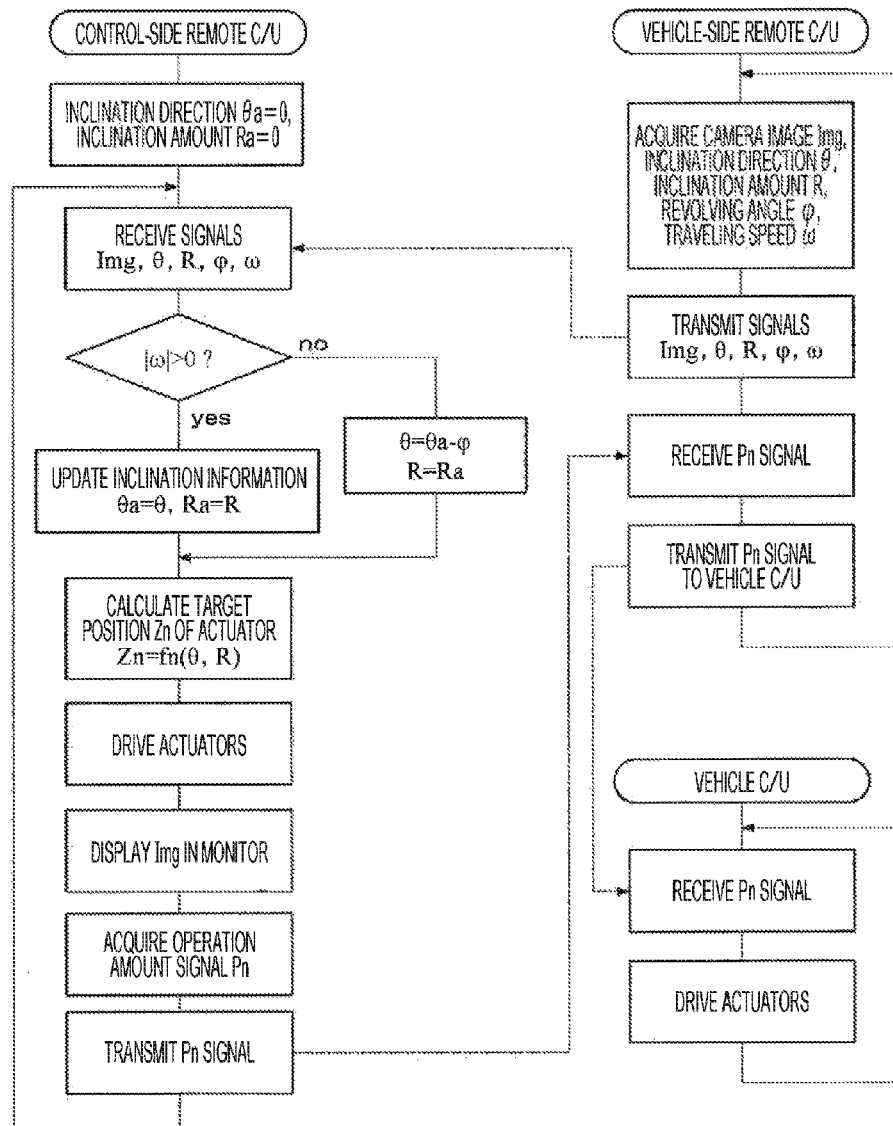
FIG. 5 is a control flowchart of the remote control system.
Figure 6:
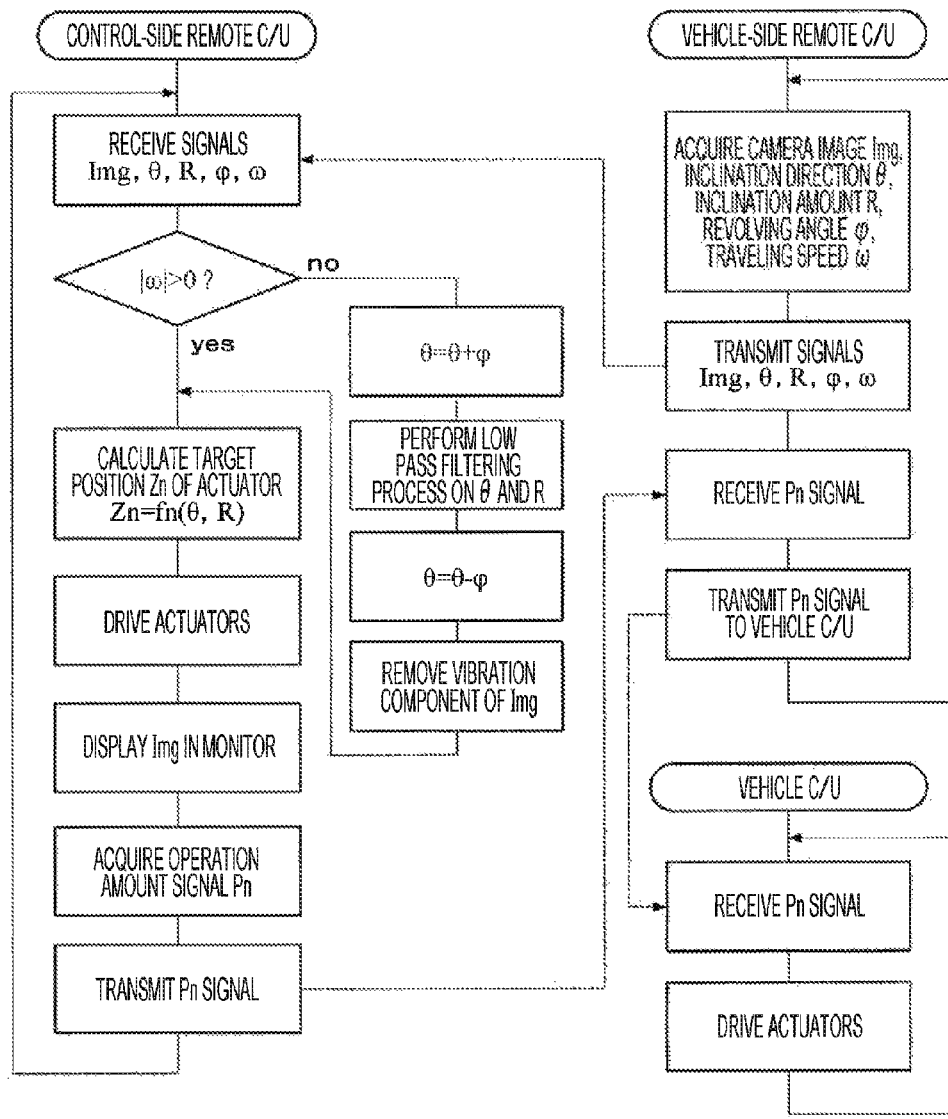
FIG. 6 is a control flowchart of a remote control system according to a second embodiment.

Hereinafter, embodiments of the invention will be described with reference to the drawings. FIGS. 1 to 5 illustrate a first embodiment, and FIG. 6 illustrates a second embodiment. Further, the same portions and configurations will be attached with the same symbols in all the drawings.

The entire configurations of a remote control system of a work machine according to the first embodiment will be described using FIGS. 1 to 4. In this embodiment, the description will be exemplified using a hydraulic shovel as the work machine. However, the work machine in the invention is not limited to the hydraulic shovel, but may be applied to any other machines which are capable of traveling on the ground surface among all types of work machines performing excavating, loading, and transporting.

Figure 1:
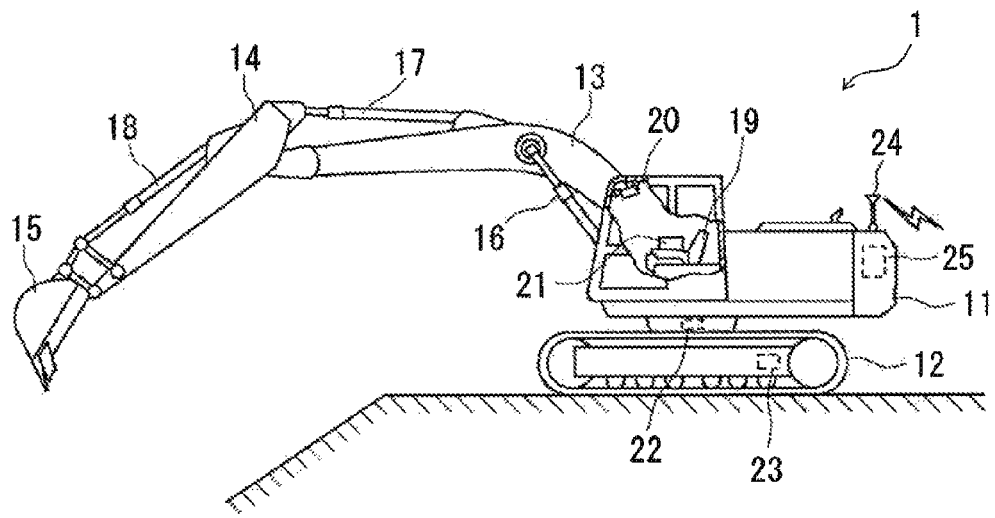
FIG. 1 is a diagram illustrating a remote control system of a work machine according to a first embodiment.
Figure 1:
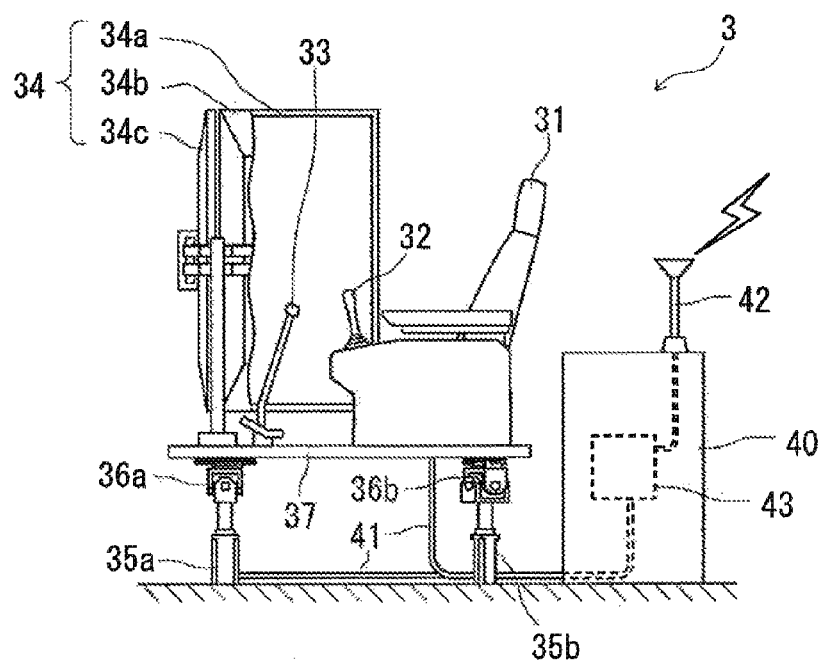
Figure 2:
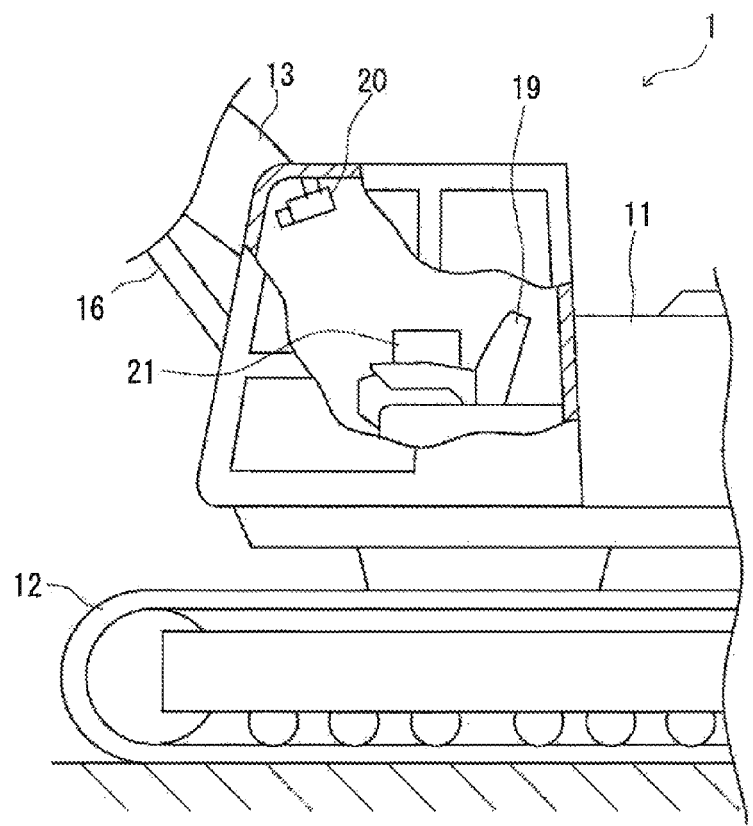
FIG. 2 is a partially enlarged view of a hydraulic shovel of FIG. 1.

FIG. 1 illustrates the remote control system of the hydraulic shovel, and FIG. 2 is an enlarged view of the vicinity of a driver seat of the hydraulic shovel of FIG. 1. In addition, FIG. 4 is a block diagram illustrating a configuration of each component of the remote control system of FIG. 1. Hereinafter, the remote control system of the hydraulic shovel according to the first embodiment will be described using FIGS. 1, 2, and 4.

The remote control system of the hydraulic shovel according to the first embodiment mainly includes a hydraulic shovel 1 which is a remote control target, and a remote control facility 3 which is installed at a remote place and includes various parts necessary for an actual control of an operator.

Similarly to a typical hydraulic shovel, the hydraulic shovel 1 is configured by a revolving superstructure 11, a lower structure 12 including a crawler, a boom 13 forming a front portion for excavating work, an arm 14, a bucket 15, a boom cylinder 16 which drives the boom 13, an arm cylinder 17 which drives the arm 14, a bucket cylinder 18 which drives the bucket 15, and a driver seat 19 which is provided in the revolving superstructure 11.

The revolving superstructure 11 is rotatably supported to the lower structure 12, and the revolving superstructure 11 is rotatably driven relatively to the lower structure 12 by a revolving motor (not illustrated). One end of the boom 13 is rotatably supported to the revolving superstructure 11, and the boom 13 is rotatably driven relatively to the revolving superstructure 11 according to the stretching of the boom cylinder 16. One end of the arm 14 is rotatably supported to the boom 13, and the arm 14 is rotatably driven relatively to the boom 13 according to the stretching of the arm cylinder 17. The bucket 15 is rotatably supported to the arm 14, and the bucket 15 is rotatably driven relatively to the arm 14 according to the stretching of the bucket cylinder 18. The hydraulic shovel 1 having such a configuration controls the bucket 15 to an arbitrary position and to a posture by driving the revolving motor, the boom cylinder 16, the arm cylinder 17, and the bucket cylinder 18 to be at appropriate positions, so that a desired work can be performed. The revolving motor and the respective cylinders are controlled by a vehicle control unit 26, and can move the revolving motor and the respective cylinders by sending a lever signal indicating a control of each part to the vehicle control unit 26.

Further, the driver seat 19 is disposed in the hydraulic shovel 1 in this embodiment, but the driver seat 19 is not necessarily required since the hydraulic shovel is a remote controlled machine. However, it is sufficiently considered that an operator partially gets on even when the hydraulic shovel is an actual target machine to be remotely controlled. In addition, since there is a low necessity to intentionally exclude the driver seat, the driver seat 19 is disposed in the hydraulic shovel 1 in this embodiment.

Besides these configurations, the hydraulic shovel 1 in this embodiment includes a camera 20 which is disposed in the revolving superstructure 11 and serves as an image detection unit to detect an image viewed from the machine, an inclination sensor 21 which is disposed in the revolving superstructure 11 and serves as an inclination detection unit to detect an inclination direction and an inclination amount of the machine, a revolving sensor 22 which serves as a revolving detection unit to detect a rotation amount of the revolving superstructure 11 with respect to the lower structure 12, a traveling rotation sensor 23 which serves as a traveling state detection unit to detect a rotation frequency of a traveling motor, a vehicle-side remote control unit 25 which acquires and processes signals from these sensors, and a wireless communication antenna 24. Further, the revolving detection unit may have a function of detecting each angular speed of the revolving superstructure 11 and integrating the detected angular speed to obtain the rotation amount as well as acquiring a relative rotation amount between the lower structure 12 and the revolving superstructure 11. In addition, the traveling state detection unit may have a function of determining whether the traveling is kept on by an instruction from a control signal of the operator as well as detecting the rotation frequency of the traveling motor.

With this configuration, the image viewed from the machine, the inclination direction and the inclination amount of the machine, the revolving amount, and the traveling speed are acquired by the respective sensors and subjected to an appropriate process by the vehicle-side remote control unit 25. Then, the information can be transmitted to the remote control facility 3 through the wireless communication antenna 24.

Further, this embodiment is configured such that the information is exchanged between the remote control target machine and the control facility using the wireless communication. However, a wired communication may be used when a distance between the machine and the control facility is small. In that case, a transmittable information amount is increased, so that it is possible to transmit or receive an image having a lesser time delay and an image having a higher resolution.

The remote control facility 3 includes a seat 31 on which the operator sits, a front control lever 32 through which movements of the revolving motor and various cylinders are input, a traveling control lever 33 through which a movement of the traveling motor is input, a monitor 34 in which an image captured by the camera 20 is displayed, a pedestal 37 on which the seat 31, the traveling control lever 33, and the monitor 34 are placed, an actuator 35 which drives the pedestal 37 to be inclined, a connection portion 36 which connects the actuator 35 and the pedestal 37, a control box 40, and a wireless communication antenna 42. In the control box 40, there is disposed a control-side remote control unit 43 which performs information communication with the vehicle-side remote control unit 25 through the wireless communication antenna 42, information acquisition of the control levers 32 and 33, outputting of image information to the monitor 34, and control of the actuator 35. The remote control unit 43 is electrically connected to the control levers 32 and 33, the monitor 34, and the actuator 35 through a cable 41.

The monitor 34 is configured by three monitors (a right monitor 34a, a left monitor 34b, and a front monitor 34c) to widen a view angle and to give immersion feeling, so that a view angle nearly equal to an actual machine is obtained compared to a case where one front monitor is configured.

The remote control facility 3 can send the image transmitted from the hydraulic shovel 1, the inclination direction, the inclination amount, the revolving amount, and the traveling speed to the control-side remote control unit 43 through the wireless communication antenna 42. In addition, the control-side remote control unit 43 outputs the image to the monitor 34 and appropriately drives the actuator 35 to control the pedestal 37 to have the same inclination angle of the machine, and acquires operation amount signals of the front control lever 32 and the traveling control lever 33 to transmit the signals to the vehicle-side remote control unit 25 through the wireless communication antenna 42. The vehicle-side remote control unit 25 outputs the operation amount signals of the respective control levers transmitted from the control-side remote control unit 43 through the wireless communication antenna 24 toward the vehicle control unit 26. The vehicle control unit 26 appropriately controls the revolving motor and the respective cylinders on the basis of the obtained operation amount signals.

With such a configuration, the operator sits on the seat 31 in the remote control facility 3, watches the image displayed in the monitor 34, and at the same time operates the respective control levers 32 and 33 while feeling the inclination information of the machine through the inclined seat 31, so that the operator can control the hydraulic shovel 1 at a remote place with feeling nearly equal to that in the actual machine.

Figure 3:
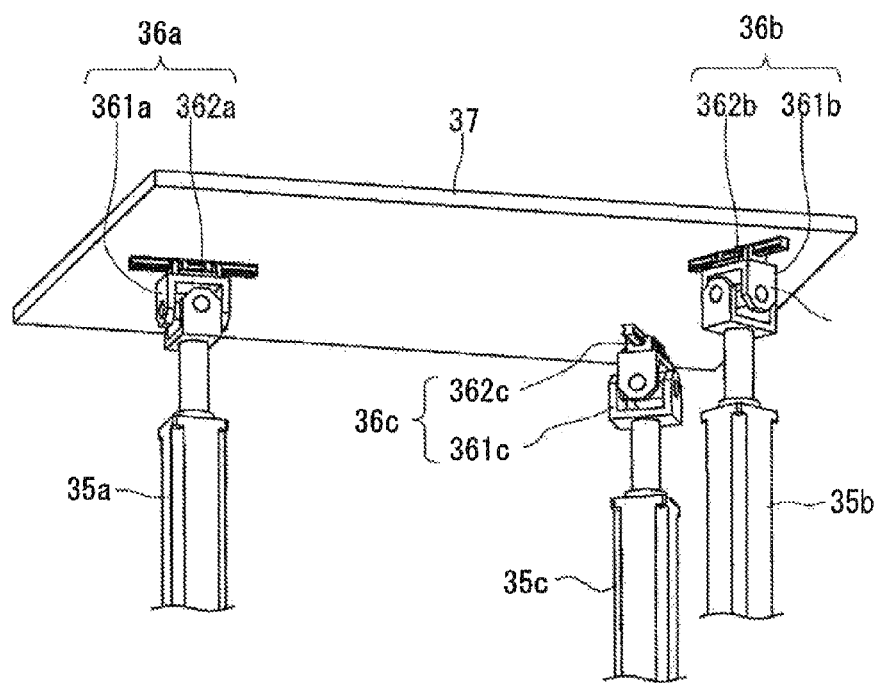
FIG. 3 is a diagram illustrating a configuration of a pedestal driving machine of a remote control seat.

Next, an inclination driving structure of the pedestal 37 will be described using FIG. 3. The pedestal 37 is connected to three actuators 35a, 35b, and 35c through connection portions 36a, 36b, and 36c, respectively. The actuator 35 (35a to 35c) is a motor or hydraulic cylinder which linearly moves, and includes a cylinder rod which is stretchable in a vertical direction. The connection portion 36 (36a to 36c) is configured by both of a universal joint 361 (361a to 361c) and a linear guide 362 (362a to 362c). In addition, the cylinder rod of the actuator 35 is not restricted in rotation about the axis in an advancing direction. The actuator 35 has total four flexibilities of three axial rotations and uniaxial translation in cooperation with the connection portion 36, and connected to the pedestal 37. In addition, three linear guides 362 are disposed such that virtual axial extensions in the guide direction are matched in the vicinity of a triangle formed by connecting the intersections between axes in the advancing direction of three actuators 35 and the pedestal 37.

With such a configuration, the pedestal 37 is disposed to be in an arbitrary inclination direction and have an arbitrary inclination amount by appropriately controlling the stretching of the cylinder rods of three actuators 35. Therefore, the pedestal 37 and the seat 31 disposed therein can be inclined. In addition, the pedestal 37 can also be translationally driven in the vertical direction, and vertical vibration of the machine can be realized by the seat 31.

Next, the entire control flow of the remote control system performed in this embodiment will be described using FIG. 4. In FIG. 4, only some portions related to the remote control system in the processes performed in three control units (the control-side remote control unit, the vehicle-side remote control unit, and the vehicle control unit) are illustrated.

First, a process flow of the vehicle will be described. In the vehicle, first, the vehicle-side remote control unit 25 acquires the up-to-date data such as a camera image Img, an inclination direction θ, an inclination amount R, a revolving amount φ, and a traveling speed ω from the camera 20, the inclination sensor 21, the revolving sensor 22, and the traveling rotation sensor 23. Then, the vehicle-side remote control unit transmits these sensor signals to the control-side remote control unit 43 through wireless communication. Operation amount signals Pn of the control levers 32 and 33 are received from the control-side remote control unit 43, and transmitted to the vehicle control unit 26. In the vehicle control unit, the revolving motor, the boom cylinder 16, the arm cylinder 17, or the bucket cylinder 18 is driven on the basis of the received operation amount signal Pn.

Subsequently, a process flow of the remote control machine will be described using a flowchart of FIG. 5. The control-side remote control unit has a variable θa in the inclination direction to hold a posture of the pedestal 37 when traveling, and a variable Ra of the inclination amount. These variables are substituted with "0" as an initial value at the first. Next, the camera image Img, the inclination direction θ, the inclination amount R, the revolving amount φ, and the traveling speed ω are received from the vehicle-side remote control unit. When an absolute value of the traveling speed ω is equal to or more than "0" (in traveling), the variables θa and Ra are updated as the received inclination information θ and R. When a rotation frequency ω of the traveling motor is "0", the variables θa and Ra are not updated. The variables θa and Ra remain at the last values (at the moment of stopping) at the time of traveling. In addition, a revolving angle φ is subtracted from the variable θa only when the traveling speed ω is "0", and the value is substituted to θ and R is substituted to Ra. A target position of the actuator 35 is calculated on the basis of θ and R, and the actuator 35 is controlled to be placed at the target position. Next, the received camera image is output to the monitor 34, and the camera image is displayed on the monitor 34. Finally, the operation amounts Pn of the front control lever 32 and the traveling control lever 33 are acquired, and transmitted to the vehicle-side remote control unit 25.

Through such a process, only when the hydraulic shovel 1 is traveling, the pedestal 37 and the seat 31 disposed therein are controlled in real time to be the inclination direction and the inclination amount obtained by the inclination sensor 21. In a case where the hydraulic shovel 1 is not in traveling, the seat 31 is controlled to hold the same inclination amount. In addition, when the revolving superstructure 11 is revolved with respect to the lower structure 12 in a state where the hydraulic shovel 1 is not in traveling, the inclination direction of the revolving superstructure 11 is calculated in accordance with the revolving angle.

The description will be made about the effects of the remote control system configured as described. First, the seat where the operator sits is inclined in accordance with the inclination information of the machine in order to prevent an accident such as overturning due to a false recognition on the inclination angle of the machine at the time of traveling. Therefore, the inclination information of the machine is provided to the operator to be sensible, and it is possible to improve safety. On the other hand, when the boom, the arm, and the bucket are violently operated for work in the case of the hydraulic shovel for example, the machine may vibrate severely. The vibration is less necessary for the work of the operator, and becomes one of factors causing fatigue of the operator. In general, the machine stops traveling at the time of working, and the inclination amount of the machine is less changed at the time of traveling stop. Therefore, at the time of traveling stop, the inclination amount of the machine is kept to be the last inclination amount (almost the same as the inclination amount at the moment of traveling stop) at the time of traveling. In a case where the inclination direction is changed by the revolving at the time of traveling stop, the inclination direction during or after the revolving is calculated from the kept inclination direction and the revolving amount. Therefore, it is possible to control the seat such that the seat where the operator sits does not come into synchronization with the vibration of the machine generated by the work. With such a configuration, it is possible to prevent the vibration of the machine causing the fatigue from being transferred to the operator, reduce the fatigue of the operator, and improve the workability.

In this embodiment, the description has been made about the hydraulic shovel as the work machine. Therefore, the inclination direction may be changed by the revolving amount even at the time of traveling stop. While there is performed the calculation process of the inclination direction due to the revolving amount, such a calculation process of the inclination direction due to the revolving amount is not necessary when the inclination sensor is disposed in the lower structure even in the work machine which does not revolve like a wheel loader for example or the hydraulic shovel. Further, the revolving sensor is also not necessary. In addition, in this embodiment, a branching process of determining whether it is in traveling or the calculation process in the inclination direction after the branching is performed by the control-side remote control unit 43. However, these processes may be performed by the vehicle-side remote control unit 25. In a case where these processes are performed by the control-side remote control unit 43, the amount of calculation performed by the vehicle-side remote control unit 25 is reduced. Therefore, it is possible to mount a small-scale or inexpensive control unit in the vehicle. On the other hand, in a case where these processes are performed by the vehicle-side remote control unit 25, the information of the revolving amount and the traveling speed is not necessarily transmitted to the control-side remote control unit. Therefore, the amount of communication can be reduced.

Next, a remote control system of a work machine according to the second embodiment of the invention will be described using FIG. 6. A difference between the second embodiment and the first embodiment is only a processing content of the control, and other configurations are the same as those of the first embodiment, and thus the drawing and the descriptions thereof will be omitted. Even in this embodiment, the hydraulic shovel is exemplified as the work machine similarly to the first embodiment. However, the work machine in the invention is not limited to the hydraulic shovel, but may be applied to any other machine which is capable of traveling on the ground surface among all types of work machines performing excavating, loading, and transporting.

The flowchart of FIG. 6 illustrates a flow of the entire control of the remote control system according to the second embodiment. A process performed in the control-side remote controller 43 is a difference from the first embodiment. Herein, only the difference from the first embodiment will be described.

A processing content in the control-side remote control unit 43 in the second embodiment is different from that of the first embodiment; that is, the variables θa and Ra for keeping the inclination information are not used. Therefore, a process in which the values of θa and Ra are updated during the traveling, or the inclination information at the moment of stop is kept on at the time of traveling stop is not performed. Alternatively, the following process is performed during the traveling stop. In other words, the revolving amount φ is added to the inclination direction θ, θ and R after addition are subjected to a low pass filter, and the revolving amount φ is subtracted from the filtered θ. When the revolving amount φ is added to the inclination direction θ in a case where the traveling is stopped in a state where the revolving amount is "φ", the inclination direction after addition is matched to the inclination direction of the lower structure. When the result value is subjected to the low pass filter, the vibration component generated in the work can be removed. The inclination direction after the low pass filtering process and an inclination direction θa at the moment of traveling stop in the first embodiment become almost the same value. While θa and Ra are not changed at all in the middle of traveling stop, θ and R after being subjected to the low pass filtering process of this embodiment are set to change the inclination direction and the inclination amount of the machine even in the middle of traveling stop in order to prevent the machine from being inclined when the ground surface is collapsed for example. In this case, the inclination information can be extracted. The operator can be correctly provided with the inclination information of the machine at the revolving amount φ by subtracting the revolving amount φ from the inclination direction after the low pass filtering process.

In a series of processes in the middle of the traveling stop of this embodiment, the calculation is performed by the revolving amount on a low frequency component of the inclination information while the inclination information at the moment of traveling stop is kept on and the calculation is performed by the revolving amount in the first embodiment. Through such a process, it is possible to cope with a case where the inclination direction and the inclination amount of the machine are changed even in the middle of traveling stop. In addition, when the inclination direction θ is simply subjected to the low pass filtering process, a phase delay is generated and there is a strong possibility that the synchronization does not occur with the change in the inclination direction caused by the revolving. On the other hand, in the process of this embodiment, there is a possibility that the synchronization occurs with the change in the inclination direction caused by the revolving.

With such a configuration, the inclination information of the machine which changes even in the time of traveling stop can be provided toward the operator in addition to the effect of the invention in the first embodiment. For example, it is possible to cope with even a situation that the machine is inclined when a hill is collapsed in the middle of traveling stop. Further, it is possible to improve the safety still more.

Another difference in the processing content of the control-side remote control unit 43 in the second embodiment from that of the first embodiment is that the vibration component in the image Img obtained from the camera 20 caused by the vibration of the machine is removed only at the time of traveling stop. Therefore, the process of transmitting the image Img to the control-side remote control unit is added. As a method of removing the vibration component of the image Img, the image may be shifted on the basis of the information of the inclination direction θ and the inclination amount R obtained from the inclination sensor 21.

With such a configuration, both the inclination amount and the image of the seat to be provided to the operator do not contain the vibration component at the time of traveling stop, and the movement and the image of the seat can be synchronized. With such a configuration, it is possible to reduce the fatigue of the operator caused by a deviation between feeling information and visual information.

Further, even in this embodiment, the branching process of determining whether it is in traveling or the process after the branching may be performed by the vehicle-side remote control unit 43 similarly to the first embodiment.

REFERENCE SIGNS LIST

1 hydraulic shovel
11 revolving superstructure
12 lower structure
13 boom
14 arm
15 bucket
16 boom cylinder
17 arm cylinder
18 bucket cylinder
19 driver seat
20 camera
21 inclination sensor
22 revolving sensor
23 traveling rotation sensor
24 wireless communication antenna
25 vehicle-side remote control unit
26 vehicle control unit
3 remote control facility
31 seat
32 front control lever
33 traveling control lever
34 monitor
35 actuator
36 connection portion
37 pedestal
40 control box
41 cable
42 wireless communication antenna
43 control-side remote control unit

The invention claimed is:

1. A remote control system for a work machine which is controlled by an operator from a remote control facility installed at a remote place, wherein
the work machine includes
a traveling unit via which the work machine travels on a ground, and
an inclination sensor that detects an inclination direction and an inclination amount of the work machine,
the remote control facility includes
a seat on which the operator sits, and
an actuator configured to incline the seat,
the actuator inclines the seat such that the seat is synchronized with the inclination direction and the inclination amount detected by the inclination sensor when the work machine is traveling, and
in response to determining that the work machine is not traveling, the inclination direction and the inclination amount detected by the inclination sensor are not updated for controlling the inclination of the seat, and the inclination of the seat is controlled to keep an inclination amount previously detected by the inclination sensor.

2. The remote control system of the work machine according to claim 1,
wherein the seat is inclined to be synchronized with a low frequency component of the inclination amount detected by the inclination sensor when the work machine is not traveling.

3. The remote control system of the work machine according to claim 1, wherein
the work machine includes a travel sensor that detects whether the work machine is traveling or stopped,
the actuator inclines the seat to be synchronized with the inclination direction and the inclination amount detected by the inclination sensor during a period when the travel sensor detects that the work machine is traveling, and
the inclination of the seat is controlled to be kept in an inclination amount detected by the inclination sensor at the time when the travel sensor is switched from a traveling state to a stopped state during a period when the travel sensor detects that the work machine is stopped.

4. A remote control system of a work machine which is controlled by an operator from a remote control facility installed at a remote place, wherein
the work machine includes
a traveling unit via which the work machine travels on a ground, and
an inclination sensor that detects an inclination direction and an inclination amount of the work machine,
the remote control facility includes
a seat on which the operator sits, and
an actuator configured to incline the seat,
the actuator inclines the seat such that the seat is synchronized with the inclination direction and the inclination amount detected by the inclination sensor when the work machine is traveling,
the inclination of the seat is controlled to keep a certain inclination amount when the work machine is not traveling,
the work machine is configured by a lower structure and a revolving body that is supported to be rotatably about a vertical axis with respect to the lower structure, and includes a revolving sensor that detects a rotation amount of the revolving body with respect to the lower structure, and
when the work machine is not traveling, an inclination direction of the lower structure is acquired by the inclination sensor, an inclination direction of the revolving body is derived on the basis of the rotation amount detected by the revolving sensor with respect to the inclination direction of the lower structure, and the seat is inclined to be synchronized with the revolving body in the inclination direction of the revolving body.

5. A remote control system of a work machine which is controlled by an operator from a remote control facility installed at a remote place, wherein
the work machine includes
a traveling unit via which the work machine travels on a ground, and
an inclination sensor that detects an inclination direction and an inclination amount of the work machine,
the remote control facility includes
a seat on which the operator sits, and
an actuator configured to incline the seat,
the actuator inclines the seat such that the seat is synchronized with the inclination direction and the inclination amount detected by the inclination sensor when the work machine is traveling,
the inclination of the seat is controlled to keep a certain inclination amount when the work machine is not traveling,
the work machine includes an image sensor that detects an image viewed from the work machine,
the remote control facility includes an image display that indicates an image to the operator,
the image detected by the image sensor is output to the image display without any change when the work machine is traveling, and
when the work machine is not traveling, a vibration component in the image detected by the image sensor caused by an inclination vibration of the work machine is removed and the image is then output by the image display.

* * * * *